July 8, 1952  A. COLONNA  2,602,646
STEAM PAD
Filed Oct. 21, 1949
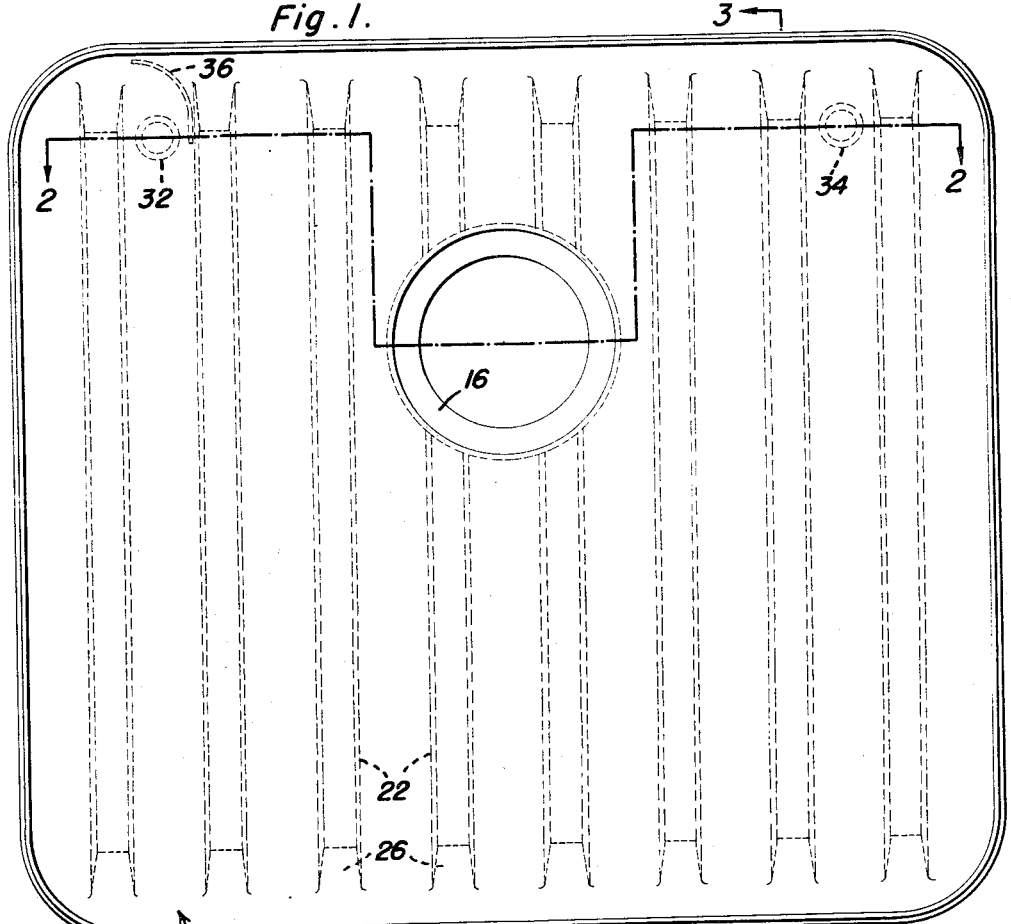
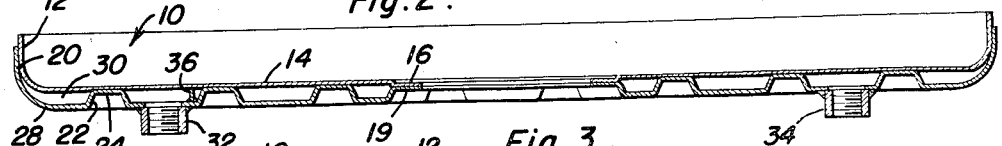
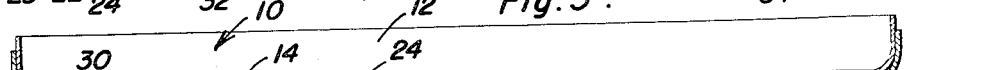
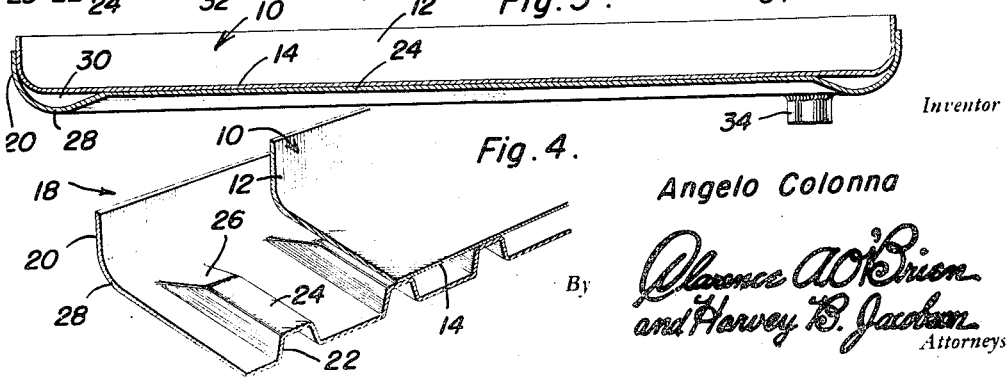
Inventor
Angelo Colonna
By Clarence A. O'Brien
and Harvey B. Jacobson
Attorneys Patented July 8, 1952

2,602,646

UNITED STATES PATENT OFFICE 2,602,646

STEAM PAD

Angelo Colonna, Philadelphia, Pa.

Application October 21, 1949, Serial No. 122,661

3 Claims. (Cl. 257—208)

This invention relates generally to stainless sheet steel and metal specialties used in association with food and beverage service equipment on railroad diners, in restaurants and kitchens with available steam supply means and relates more particularly to a steam heated food warming pad construction wherein a wall portion of a vessel is combined with a plate of novel character to provide a steam circulator unit having circuitous passages between the plate and the wall of the vessel, whereby live steam may be effectively circulated through the passages to heat the vessel for miscellaneous kitchen requirements.

A basic object of this invention is to provide a plate of a special configuration adapted to coact with a wall of a vessel in creating a steam heated hot pad for heating such vessels as sinks, kettles, vats, vegetable steamers, bathtubs, and the like.

Another object of this invention is to provide a device which may be easily attached to many different types of vessels to replace conventional steam coils ordinarily located on the inside or bottom of the vessel, which construction makes it difficult to maintain the vessel in a sanitary condition, while the discomfort and actual danger of injury to the attendant is considerably greater when this conventional type of heating means is used.

Still another object of this invention is to provide a steam pad construction in which a supporting rim is provided on the under side of a vessel, when this device is incorporated with the bottom wall of the vessel, this rim being uninterrupted and comprising a better means of support for the vessel than a non-continuous rim, or legs, or a wide flat surface, as ordinarily provided in devices of this sort.

Another object of this invention, ancillary to the preceding object, is to provide an uninterrupted rim portion which seats flat upon a floor or other support, preventing accumulation of undesired matter under the vessel, it being understood that in laboratory installations of such vessels, in large kitchens, and the like, this aid to cleanliness is an important feature.

A further object of the invention is to fit a dished vessel or receptacle of pan-like form into a corresponding pan-like base plate with the two constructed of sheet metal and to extrude or otherwise form hollow, channel-shaped ribs in the base plate for jointed association with the wall of the vessel or receiver to thus provide a free steam circulating jacket which is usable as the stated hot pad and wherein circuitous passages are provided for uniform and effective circulation of the steam to thus prevent buckling or distortion of the coacting parts, whereby to provide a construction in which manufacturers and users will find their respective requirements and needs effectively met and contained.

Then, too, novelty is predicated upon the marginal flanged ribbed plate having flat crown portions on the ribs with the wall of the vessel or receiver preferably flat and in intimate resting contact with said flat crown portions and wherein said wall has an endless marginal flange fitting telescopically into the corresponding flange on the base plate, thus providing a strong, reliable and economical circulator unit which may be used, as stated, as a hot pad for warming foods and the like in kitchens or may be used in whatever other line of endeavor a steam circulating, heat radiating unit is conveniently and aptly usable.

With these objects definitely in view, this invention resides in certain novel features of construction, combination and arrangement of elements and portions as will be hereinafter described in detail in the specification, particularly pointed out in the appended claims and illustrated in the accompanying drawings which form a material part of this application, and in which:

Figure 1 is a top plan view of a vessel of sink character with this invention applied thereto;

Figures 2 and 3 are vertical transverse sectional views, taken on the corresponding section lines 2—2 and 3—3 in Figure 1; and Figure 4 is a fragmentary view, in perspective, of sections of the above referred to vessel and the parts hereinafter referred to generally as the plates.

Similar characters of reference designate similar or identical elements and portions throughout the specification and throughout the different views in the drawing.

Referring now to the drawings in detail, this invention is adapted to be used with an environment including a vessel such as that indicated generally at 10. To exemplify the invention, there is illustrated a vessel 10 of sink character, although it will be understood that the exact configuration of the vessel is immaterial in this invention.

The vessel 10 is illustrated as having vertical rim wall 12 and a flat bottom wall 14. The vessel 10 will also ordinarily have an outlet which may comprise an aperture with a downwardly pressed rim 16.

While it will be understood that this device may be incorporated with a vertical wall of a vessel, the invention is illustrated as combined with the bottom wall 14, and the bottom wall 14 comprises an element in this invention, used with the plate generally indicated at 18. The plate 18 has an aperture designed to register with the outlet aperture in the vessel 10, and a rim portion 19 will be provided and sealed, as by welding or otherwise, with the rim 16 of the vessel, as clearly indicated in Figure 2. The plate 18 will have a flange 20 disposed peripherally of the plate and configurated to conform with the portion of the vessel 10 whereon the plate is to be secured, the method of securement being ordinarily welding, although any other type of close seal may be employed. The plate 18 is provided with a plurality of preferably parallel channel portions 22 which will be integral with the main portion of the plate and which will ordinarily comprise struck-up portions of the central portion of the plate. The bight parts 24 of the channel portions 22 will be flat and these bight parts will be rigidly secured or at least closely sealed to the wall 14 of the vessel.

A labyrinthal chamber is defined between the plate 18 and the wall 14, and it is important that these spaces between the channel portions 22 be in communication with each other. With this in view, the channel portions 22 are reduced at each end, as indicated at 26, with the result that a continuous rim 28 is provided in the plate 18, and a channel 30 extends across each end of the channel portions 22 to connect the spaces between the channel portions and to allow steam to circulate within the said chamber.

A steam inlet 32 and a steam outlet 34, ordinarily comprising merely nipples rigidly secured to the plate 18, between adjacent channel portions 22, will necessarily be provided in order that live steam may be introduced into and withdrawn from the said chamber, a source of such steam being not illustrated in the drawings, since this is not a part of the present invention. A baffle 36 will be provided in the chamber and positioned as best illustrated in Figure 1 to insure that the steam, upon entering the chamber, does not flow directly toward the steam outlet but is forced to travel a circuitous route through the chamber.

The operation of this invention will be clearly understood from a consideration of the foregoing description of the mechanical details thereof, taken in connection with the drawings and with the above recitation of the objects of this invention, and further description would appear unnecessary.

Having described the invention, what is claimed as new is:

1. In combination, a sheet metal plate having an upstanding flange circumscribing the entire marginal edge portions of the plate, the body portion of said plate having upwardly indented reinforcing ribs channel-shaped in cross-section, the channels defined by said ribs opening downwardly, said ribs being in spaced parallelism with each other and the outermost ribs being spaced from and parallel with the adjacent flanges, the crown portions of said ribs being flat and all in the same plane, which plane is below the plane of the upper edges of said marginal flange, the respective end portions of said ribs being gradually decreased in cross-section and merging with said body portion at points inwardly of and spaced from said flange, said ribs providing steam circulating spaces between one another and a marginal steam circulating space between the respective end portions of the ribs and said marginal flange, a vessel embodying an imperforate sheet metal wall disposed within the bounding confines of said flange, resting firmly atop the flat crown portions of said ribs and having its marginal portions welded to corresponding portions of said flange and providing a closed free steam circulating passage between itself and said plate, means for introducing steam into said passage at one corner of the latter, means for discharging the steam at a remote corner of the passage, and a steam directing baffle interposed between said plate and wall and confined to a place of proximity to said steam introducing means.

2. The structure defined in claim 1, said wall being flat and having an upstanding marginal wall fitting telescopically into and welded to said flange.

3. The structure defined in claim 2, and said plate having an elevated annulus defining an opening, said wall having a depressed annulus superimposed on and seamed to said first annulus and also defining an opening, said openings registering with each other.

ANGELO COLONNA.

REFERENCES CITED

The following references are of record in the file of this patent:

UNITED STATES PATENTS

| Number | Name | Date |
| --- | --- | --- |
| Re. 4,416 | Stuart et al. | June 6, 1871 |
| 158,840 | Hadcock et al. | Jan. 19, 1875 |
| 631,838 | Witherspoon | Aug. 29, 1899 |
| 2,016,007 | Hellen | Oct. 1, 1935 |
| 2,156,544 | Raskin | May 2, 1939 |
| 2,349,965 | Hurley | May 30, 1944 |
| 2,481,511 | Hubbell | Sept. 13, 1949 |

FOREIGN PATENTS

| Number | Country | Date |
| --- | --- | --- |
| 699,903 | France | Dec. 17, 1930 |

OTHER REFERENCES

Ser. No. 389,131, Hintze (A. P. C.), published May 25, 1943.